(12) United States Patent
Söderberg et al.

(10) Patent No.: US 8,886,764 B2
(45) Date of Patent: Nov. 11, 2014

(54) QUICK UPLOAD

(75) Inventors: Jan Ok Söderberg, Göteborg (SE);
Claes Andersson, Billdal (SE); Mikael Strömberg, Göteborg (SE)

(73) Assignee: Systemite AB, Gothenburg (SE)

( * ) Notice: Subject to any disclaimer, the term of this patent is extended or adjusted under 35 U.S.C. 154(b) by 474 days.

(21) Appl. No.: 12/893,320

(22) Filed: Sep. 29, 2010

(65) Prior Publication Data

US 2011/0082917 A1     Apr. 7, 2011

(30) Foreign Application Priority Data

Sep. 30, 2009  (EP) ..................................... 09171848

(51) Int. Cl.
*G06F 15/16*         (2006.01)
*G06F 17/00*         (2006.01)
*G06F 17/30*         (2006.01)

(52) U.S. Cl.
CPC .... *G06F 17/30607* (2013.01); *G06F 17/30513* (2013.01); *G06F 17/30572* (2013.01); *G06F 17/30539* (2013.01); *Y10S 707/99944* (2013.01)
USPC ................... 709/219; 707/999.103; 707/773; 707/776; 707/778

(58) Field of Classification Search
CPC ................... G06F 17/30607; G06F 17/30513; G06F 17/30539; G06F 17/30572
USPC ............. 709/219; 707/E17.001–17.014, 737, 707/740, 909.003, 999.103, 773, 776, 778, 707/760; 715/203, 968, 104, 105, 234
See application file for complete search history.

(56) References Cited

U.S. PATENT DOCUMENTS 5,765,159 A  *  6/1998  Srinivasan ............................. 1/1
5,940,820 A  *  8/1999  Kagiwada ............................. 1/1

(Continued)

FOREIGN PATENT DOCUMENTS

WO      2004/057500 A2      7/2004

OTHER PUBLICATIONS

Junhwan Kim et al; "Standardized data exchange of CAD models with design intent", Computer Aided Design, Elsevier Publishers BV., Barking, GB, vol. 40, No. 7, Jul. 1, 2008, pp. 760-777, XP023613874 ISSN: 0010-4485 the whole document.
European Search Report: EP 09 17 1848.

*Primary Examiner* — Wing F Chan
*Assistant Examiner* — Raji Krishnan
(74) *Attorney, Agent, or Firm* — Harness, Dickey & Pierce, PLC

(57) ABSTRACT

Method for retrieving data from an object database stored in a server (220) as a network (501) of objects (502) connected via links (503), said method including the steps of:
  storing (301) said object database in a server (220);
  forming (302) at a client (210) a request for a requested object (903) of a predetermined identity in said database and objects (904) connected to said requested object (903);
  transmitting (303) said request from said client (210) to said server (220) over a computer network (230);
  creating a data package containing said requested object (903) and objects connected to said requested object; and
  transmitting (306) said data package to said client.
The invention furthermore relates to a system for retrieving data from an object database, a server, a computer program, a computer program product and a computer system.

16 Claims, 12 Drawing Sheets

(56) References Cited

U.S. PATENT DOCUMENTS

| | | |
|---|---|---|
| 6,917,937 B1 * | 7/2005 | Rubendall .............................. 1/1 |
| 7,315,865 B1 * | 1/2008 | Jernigan, IV ................. 707/754 |
| 7,937,392 B1 * | 5/2011 | Nethi et al. ................... 707/737 |
| 2004/0215746 A1 | 10/2004 | McCanne et al. |
| 2005/0160090 A1 * | 7/2005 | Harjanto ........................... 707/3 |
| 2008/0208887 A1 * | 8/2008 | Balachandran et al. ...... 707/102 |

* cited by examiner

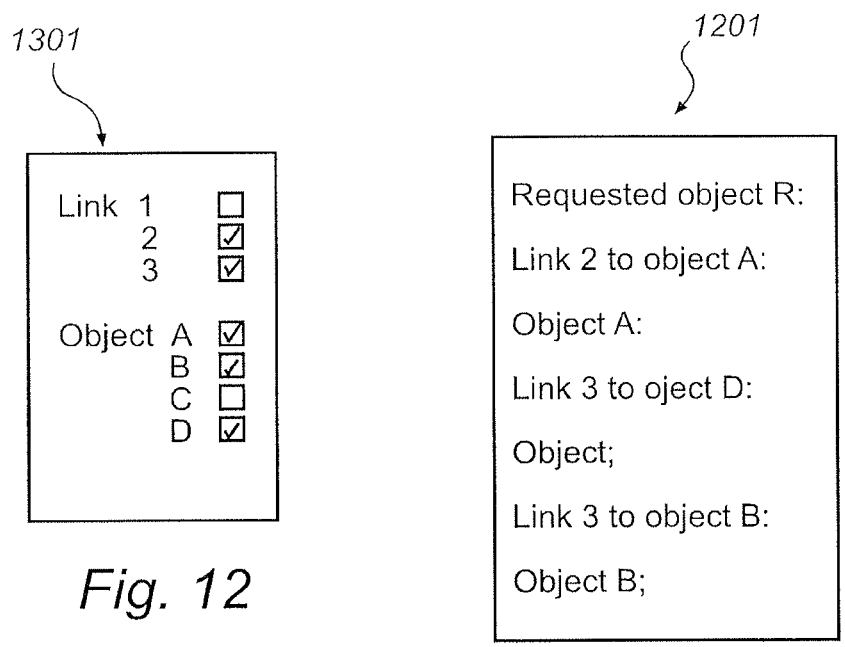
Fig. 12
Fig. 13
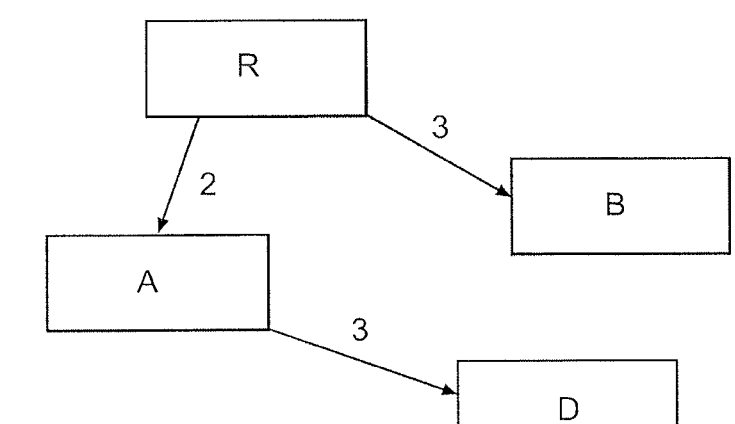
Fig. 14

QUICK UPLOAD

TECHNICAL FIELD

The present invention relates to a method for retrieving data from an object database, as well as a computer program, a computer program product, and a computer system for implementing such a method.

It also relates to a system for retrieving data from an object database and a server used in such a system.

BACKGROUND OF THE INVENTION

A modeling tool is a tool that handles models in a formalized way. When the model is stored in a database, this makes possible structured access and storing of data. For example, modeling tools can be used to develop and describe complicated technical devices or systems that are to be manufactured in the manufacturing industry. By models is in this case meant a representation of the device or system that is to be manufactured. The model is described by allowing objects to relate to each other. An object in the database may potentially be linked, directly or indirectly, to every other object in the database.

WO 2004/057500 discloses a modeling tool comprising a database server with a memory area, a processor, a set of rules in the processor for structured storage and accessing of a database in the memory area, and an incoming and an outgoing channel via which the processor is designed to handle the incoming and outgoing information to and from the memory area. The modeling tool comprises, in addition, a set of objects which are intended to be stored and represented in the database and a set of connection elements which describe the relationship between associated objects. An object is here an encapsulation of sets of data, elements and operations.

As a user works with a model, the associated objects are uploaded to a client and stored in the memory area at the client (e.g. the cache memory) to enable efficient access to the model. The client data model thus contains objects retrieved from the server. To facilitate fast access to a working set of objects, that is all objects momentarily in use by the user, the following can be performed:

The client data model may make an automatic request for the object to the server if a requested object is missing in the client data model.

The working set can in some instances be predicted or defined without explicit user actions, for instance based on working set of last log in, based on rules decided by the user or based on properties of a view, which is mainly dependent on what the view needs in order to be completed. The rules for creating a working set can effectively be based on the types of object relations and object types, since this kind of classification corresponds to the principles used in application views and user preferences.

The rules are normally implemented in software of application views, that is in the client software. The following principle applies:

A client view requests one or more objects

The view then requests more information of the object, including relations to other objects which are then requested.

The rules for flexible views may be explicit and editable:
A view requests one or many objects.
The user may navigate further in the view, requesting more objects.

The view may include more objects based on explicit rules according to the preferences of the user.

The current concept is adapted to use by an interactive user where the user may navigate and select to open related objects. This means that the rules are applied on the client side.

Objects are viewed and manipulated through an application user interface based on selections made by the user and properties of the view, which may request objects related to the object requested by the user, in order to complete a view.

The objects that should be uploaded to the client cache are identified by the client through a set of rules in the processor. This means that the client first sends an initial request to the database server, which returns the requested object and any connection elements associated therewith to the client. Based on the set of rules in the processor, the client then determines which of these connection elements should be shown and which related objects that are to be uploaded from the server database. This procedure is repeated for each additional object uploaded to the client, and additional objects are sent from the server to the client, until all required objects have been uploaded to the client.

A model in a typical development project in the manufacturing industry contains a very large number of objects, often hundreds of thousands.

Furthermore, there are typically a very large number of connections between objects, often tens of thousands.

Thus, uploading a model from the server to the client tend to be a time consuming procedure that may take minutes, or even hours.

SUMMARY OF THE INVENTION

In view of the above, an object of the invention is to solve or at least reduce the problem discussed above. In particular, an object is to reduce the time for retrieving data from an object database stored in a server.

According to a first aspect of the invention, there is provided a method for retrieving data from an object database stored in a server as a network of objects connected via links, the method including the steps of: storing the object database in a server as a network of objects connected via links; forming at a client a request for a requested object of a predetermined identity and objects connected to said requested object; transmitting the request from the client to the server over a network; wherein the following further method steps are performed: retrieving said requested object; retrieving objects connected to the requested object; creating a data package containing the requested object and a set of objects connected to the requested object; and transmitting the data package to the client.

An object database is a database which supports definition of classes of objects. In a class of objects a set of properties for objects of that class may be defined. An important aspect of object databases is the ability to inherit properties between classes. The properties of the inherited class implied to the inheriting classes. Furthermore objects may be directly linked to other objects. An object encapsulates its properties which are accessible through the objects methods. This is different from a relational database where the properties of relations are defined as tuplets. For further information about object databases it is referred to "Databases Demystified"; Oppel, Andrew; ISBN 007-225364-9

A server here refers to a computer that stores information which is communicated to and used by other computers, whereas clients here refers to computers that use the information provided by the server. The role of the server is to store the information, and to make possible reading and writing from the clients. As it is the programs that control the activities in a computer, it is always a server program that makes a computer act as a server, while at the same time a client program makes a client act as a client. By "server" can be meant either a server computer with server program or alternatively only a server program. If the information is stored in some tabular format where each quantity of information has an address, a so-called database, the server is called a database server.

A request for a requested object of a predetermined identity is intended to indicate that the request is made for a specific object whose identity is already known when the request is formed at the client. However, the identities of the objects connected to the requested object are not necessarily known when the request is formed at the client. The requested object may be uniquely identified and may be recognized e.g. by an identity marker or an identification number.

There are two primary factors that determine the time it takes to upload data from a server to a client over a network: bandwidth and latency.

Bandwidth refers to the capacity for a given system to transfer data over a connection, and can be measured in a bit rate, such as bit/s, kbits or Mbit/s. Latency refers to a measure of the amount of time that elapses while the bits traverse the network, such as the time it takes a given bit transmitted by a sender to reach the destination. As transfer of information cannot surpass the speed of light in vacuum, information transmitted across a network always incurs some nonzero latency as it travels from the source to the destination. However, the latency is typically higher as the data package incurs processing delays through each switch and router.

The present invention is based on the understanding that, the time for retrieving an object database stored in a server as a network of objects connected via links is typically is caused by latency rather than limited bandwidth. The present inventors have further realized that an efficient way to reduce the delay due to latency is to have the server create a data package containing the requested object and a set of objects connected to the requested object. As all objects that are required by the client can be transmitted in a single data package, the number of round-trips (i.e. the number times data is sent back-and-forth between the client and the server) required to upload an object database to the client can be reduced. This efficiently reduces the time it takes to upload an object database to the client.

The method may preferably be used to upload an object database (or a portion or subset thereof) from a server to a client so that the uploaded objects can be stored in the memory area at the client (e.g. the cache memory) to allow fast access when viewed and manipulated by an interactive user through an application user interface at the client.

Although the requested object and the set of objects connected to the requested object are preferably transmitted in a single data package, this data package may be split up in smaller packages on its way across the network, for example, to adapt the size of the data package to bandwidth restrictions without any substantial effect on the response time.

The set of objects that are included in the data package along with the requested object may include all objects that are connected to the requested object, or may be a subset of the objects connected to the requested object. The subset can be created by including the further steps of: selecting a set of rules for filtering out a subset of the objects connected to the requested object; and filtering out the subset of objects from among the objects connected to the requested object by applying the set of rules at the server to create a data package containing the requested object and said subset of objects. The possibility of discarding objects and to only upload a subset of the network of objects reduces the amount of data to be transferred. Thus, the time for uploading the data from the server to the client can be further reduced, especially when the requested object is connected to a large number of objects. It is noted that the method not only returns a requested object of a predetermined identity, but also allows an expansion of the requested object into a set of objects containing the requested object and related objects that are considered to be relevant to a user, wherein the relevant objects are determined according to the set of rules.

The network of objects may include a plurality of types of links; wherein the step of applying the set of rules may include retrieving objects connected to the requested object by one or more types of links which are selected on a request form and discarding objects connected to the requested object by types of links which are not selected on the request form and/or objects that are of a type not indicated on the request form. The possibility of discarding objects and to only upload a subset of the network of objects reduces the amount of data to be transferred.

The request form may be stored on the server. The request form can be stored together with a database schema. A data base schema is a structure describing the structure of the database in a formal language supported by a database management system. In the context of the invention the database schema describes which types of objects are stored in the database, which type of links that may connect the objects and further information regarding which type of information that may be stored in the objects. The schema may be stored as a table. Preferably the request form is stored in the same table and format as the database schema. The request form defines the set of rules to be applied when filtering out a subset of objects connected to the requested object.

An advantage of storing the request form together with the database schema is that a user is not tied to a particular client, but can access the request form also when working from a different client than he normally does. A further advantage is that the server may keep control over the request form so that only valid requests can be asked, that is requests that are supported by the database schema.

The request form may be stored on the client and transmitted to the server as a consequence of the request.

According to an embodiment, for each set of two directly interconnected objects, one object is declared as an owner object and one object is declared as an owned object. This ensures that changes that are made affect the model in a controlled, easy to understand and unambiguous way. Such a system is further described in WO2004/057500.

A link interconnecting the two objects may uniquely declare which object is owner and which object is owned.

The subset may include the requested object and objects owned by the requested object.

The data package may be created in a recursive manner. According to an embodiment of a recursive method the following steps are performed: in a first method step the requested object will be stored in the data package, in a second method step all Linked Objects will be identified where a Linked Object is an object that is directly linked to the requested object, in a third method step the set of rules will be applied to the Linked Objects, a fourth method step will be repeated for all Linked Objects that are according to the set of rules, said fourth method step including the step of storing the link to the Linked Object in the package followed by a request for generating a package for the Linked Object performing the first to the fourth method steps with the Linked Object as a requested object.

According to a second aspect of the invention, there is provided a system for requesting data from an object database including: a server in which a network of objects connected via links is stored; a client including an application with an information request tool for retrieving a requested object of a predetermined identity and objects connected to said requested object; a request form for retrieving the requested object and a set of objects connected to the requested object; a client transport module and a server transport module for enabling communication between the client and server over a network, wherein the server further includes a request form applicator arranged to retrieve the requested object; retrieve objects connected to the requested object; and create a data package containing the requested object and a set of objects connected to the requested object. This aspect exhibits similar advantages as the previously discussed aspect of the invention.

The request form may be configured to retrieve all objects connected to the requested object. Alternatively, the request form may include a set of rules for filtering out a subset of objects connected to said requested object, wherein the request form applicator may be arranged to filter out said subset of objects from among the objects connected to said requested object by applying said set of rules at said server to create a data package containing said requested object and said subset of objects.

The network of objects may include a plurality of types of links; wherein the request form applicator may retrieve objects connected to the requested object by one or more types of links which are selected on request form and discard objects connected to the requested object by types of links which are not selected on the request form and/or discard objects connected to the requested object which are of a type not selected on said request form.

The server may include a request form storage area.

Further, for each set of two directly interconnected objects, one object may be declared as an owner object and one object may be declared as an owned object, wherein the link interconnecting the two objects may uniquely declare which object is owner and which object is owned. This results in an object database with a closed set of linked objects, and ensures that there is an end to a recursive procedure applied to the set of linked objects (i.e. the recursive procedure will not be caught in an endless loop).

According to a third aspect of the invention, there is provided a server in a system for retrieving data from an object database including: a storage area in which a network of objects connected via links is stored; wherein the server further includes a request form storage area in which one or more request forms for retrieving a requested object of a predetermined identity and objects connected to said requested object are stored; and a request form applicator arranged to retrieve the requested object; retrieve objects connected to the requested object; and create a data package containing the requested object and a set of objects connected to the requested object. This aspect exhibits similar advantages as the previously discussed aspect of the invention The request form may be configured to retrieve all objects connected to the requested object. Alternatively, the request form may include a set of rules for filtering out a subset of objects connected to the requested object, wherein the request form applicator may be arranged to filter out said subset of objects from among the objects connected to said requested object by applying said set of rules at said server to create a data package containing said requested object and said subset of objects.

A computer program comprising program code means for performing all the steps of any one of the above described embodiments of the method when said program is run on a computer.

A computer program product comprising program code means on a computer readable medium for performing all the steps of the above described embodiments of the method, when said computer program product is run on a computer.

A computer system for implementing a method for retrieving data from an object database stored in a server as a network of objects connected via links comprising a processor operable to run the above described computer program.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 12 shows an example of a request form defining a set of rules.

FIG. 13 shows an example of a data package.

FIG. 14 shows a view of a requested object and a subset of objects connected to the requested object.

DETAILED DESCRIPTION OF PREFERRED EMBODIMENTS

Figure 1:
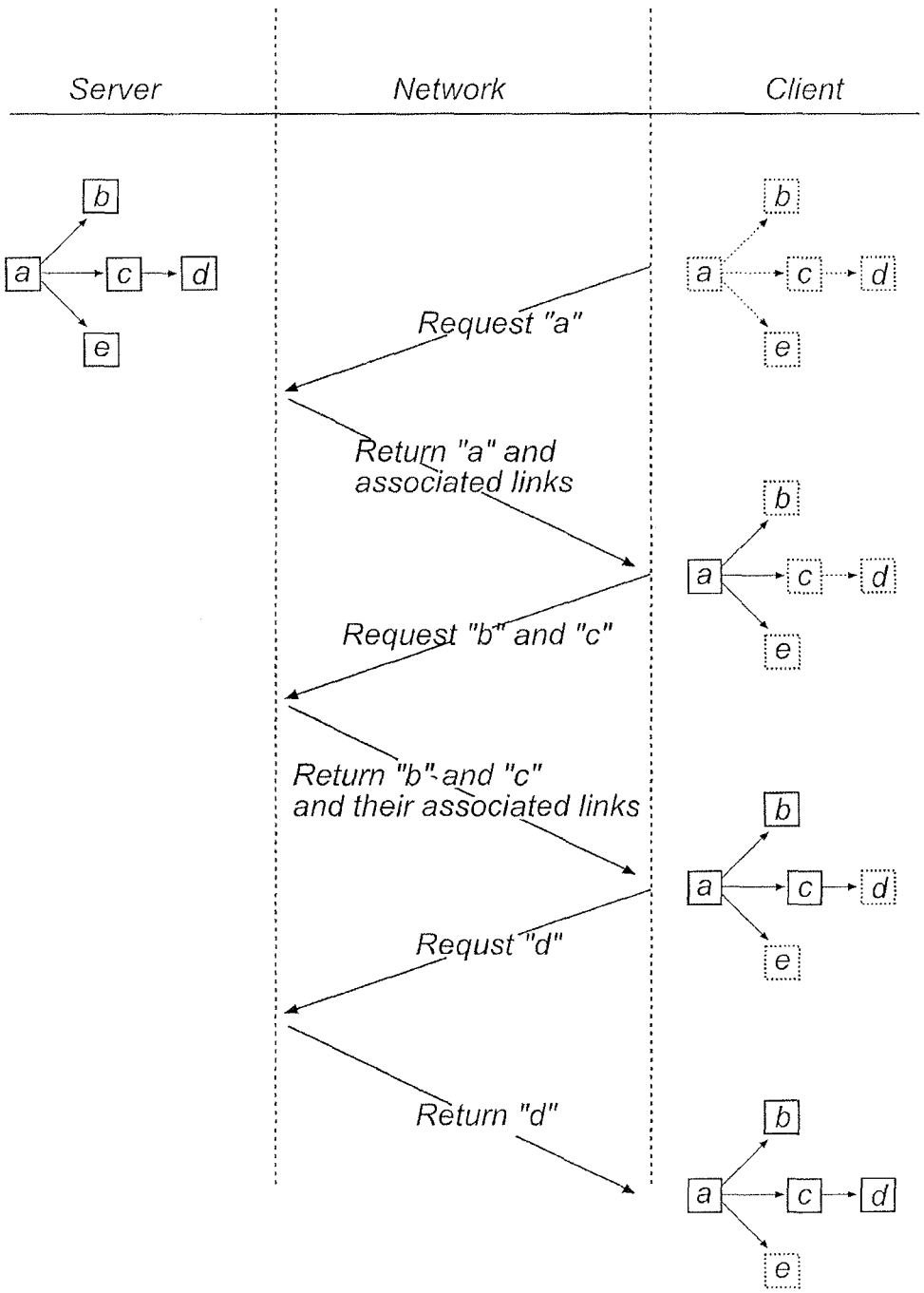
FIG. 1 schematically illustrates a method for uploading a model from a server to a client's cache according to a prior art arrangement.

FIG. 1 schematically illustrates a method for uploading a model from a server to a client's cache according to a prior art arrangement.

Referring to FIG. 1, the client sends an initial request for object "a" to the server, which returns the object "a" and the links associated therewith to the client. The client then determines, based on a set of rules, which related objects that should be uploaded from the server. Here, the rules say that object "b" and "c" should be uploaded to the client. Thus, the client requests object "b" and "c" (but not "e"), and objects "b" and "c" and the associated links are returned by the server. Now, the set of rules applied at the client says that object "d" should be uploaded. Thus, the client requests object "d", which is returned by the server. As all objects prescribed by the rules have now been uploaded the uploading of the model has been completed.

Figure 2:
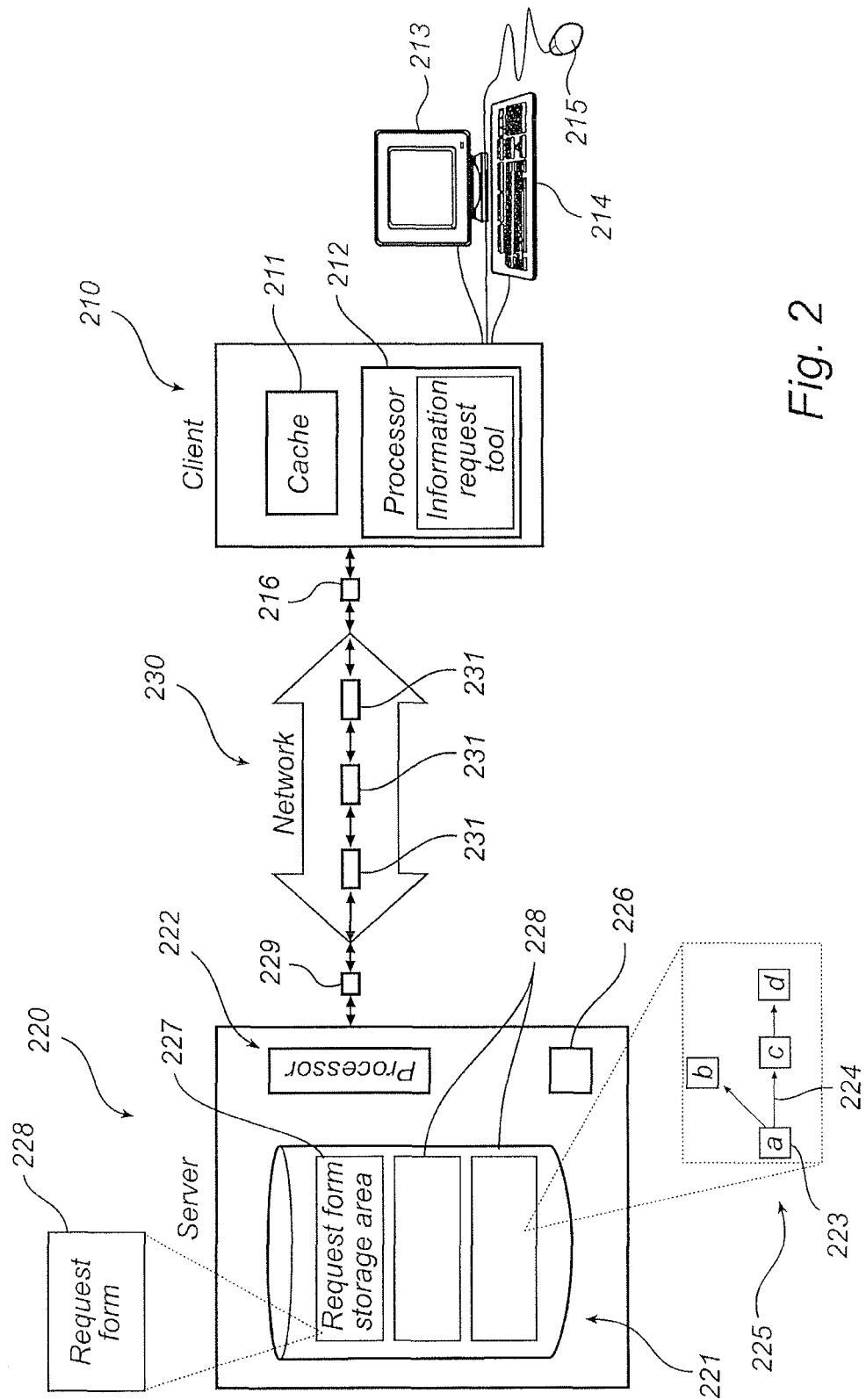
FIG. 2 schematically illustrates a system for retrieving data from an object database.

FIG. 2 schematically illustrates a system for retrieving data from an object database according to a preferred embodiment of the invention. The system is here a multi tier client-server architecture, where a client 210 and a server 220 communicate over a network 230. The server 220 comprises a general database server 221 that communicates with a specialized server program, a so-called application server 222, which in turn communicates with a client program on the client 210. The application server 222 controls the access to and changing of data stored in the database server 221. A general description of client server technologies are described in "Databases Demystified"; Oppel, Andrew; ISBN 007-225364-9

The client 210 may, for example, be a conventional personal computer. In this embodiment, the personal computer 210 comprises a memory area 211, a processor 212, a VDU (Visual Display Unit) 113 and input units in the form of a keyboard 214 and a mouse 215. The client 210 communicates with the application server 222 via a network 230. The network may be a LAN (Local Area Network) or a WAN (Wide Area Network), such as Internet, comprising a plurality of routers 231 routing the network traffic. Further details of network technologies are described in "Computer Networks"; Tanenbaum, Andrew S; ISBN 0-13-066102-3

In the illustrated embodiment, a modeling tool is executed on the client 210. By modeling tool is meant a program that, when executed on the client, makes possible the display and handling of a model. Handling here means input, storage and access of models in the database 221. By model is meant a representation of a technical object, such as a product (e.g. an engine) being developed in the manufacturing industry. An example, of a modeling tool is described in WO 2004/057500 which is hereby incorporated by reference.

Here the model 225 has a relational structure and is stored in the database server 221 as a network of objects 223 connected via links 224. (Only one network object and one link have been provided with a reference numeral to avoid cluttering the figure.) The links describe the relationship between associated objects, and for each connection between two objects indicates one of the objects as owner. There may be a plurality of types of links.

The client 210 includes an application with an information request tool for retrieving information from the database. The information request tool may include a normal query window for retrieving data from the database. This normal query window may support queries enabling retrieval of all objects of a certain type, all recently used objects, any objects used within a certain timeframe, a specific object which identification number is known, all objects of a certain size, etc. The result of the query is a set of individual objects. However, objects being connected to the requested object will not be retrieved or presented. The result may conveniently be presented as a list of objects. The information request tool furthermore supports a request for an object of a predetermined identity in said database and objects connected to said requested object. A request for a requested object of a predetermined identity is intended to indicate that the request is made for a specific object whose identity is already known when the request is formed at the client. This may be performed by selecting one of the retrieved objects from the normal query window and performing a specific request for this object in said database and objects connected to said this object. While the request via the normal query window results in a list presenting individual objects, the request for a requested object of a predetermined identity in said database and objects connected to said requested object will present the requested object and objects connected to the requested object as a structure showing the requested object and objects connected to it as a structure of linked objects.

Furthermore, the server includes a request form applicator 226 at which a request form preferably defining a set of rules for filtering out a subset of objects connected to a requested object is available. It is noted that, the identities of the objects in the subset of objects connected to the requested object are typically not known when the request is formed at the client. The request form is stored in a request form storage area 227 in the database server 221. Thus, the database server's processor 222 controls the handling of the memory area 228 and thereby the handling of the objects and links according to the set of rules prescribed by a request form.

The request form applicator may be configured to apply the set of rules at the server to create a data package containing a subset of objects. For example, the request form applicator may retrieve objects connected to the requested object by one or more types of links which are selected on request form and discarding objects connected to the requested object by types of links which are not selected on the request form. In addition or alternatively the type of objects and/or the properties of objects can be used as a filter for selecting a subset of objects from the complete model.

Figure 6:
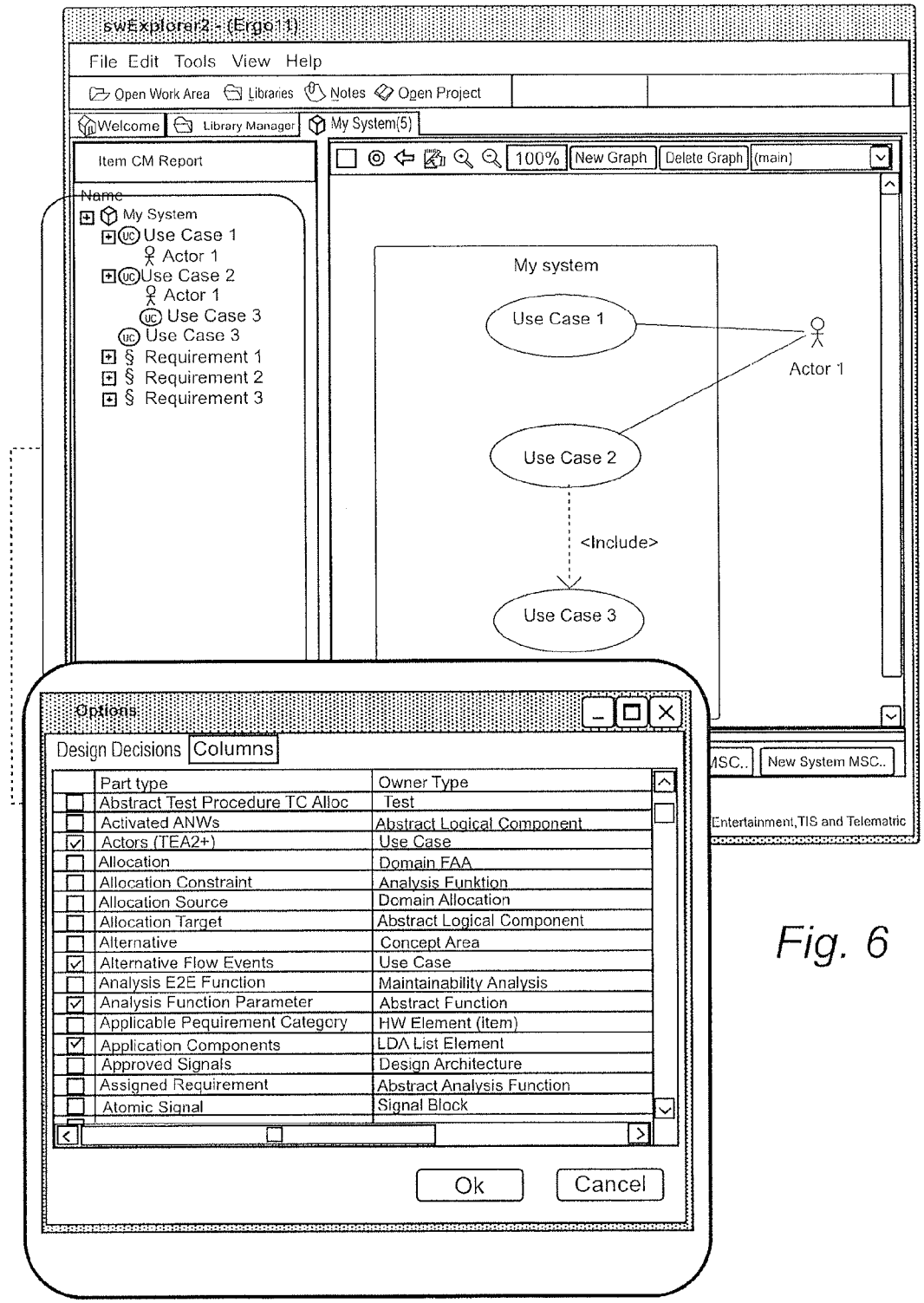
FIG. 6 illustrates a view of a model stored in a server.

According to an alternative embodiment, the request form can instead be stored at the client, or at both the server and the client. In this event the contents of the request form need to be transmitted to the server when requesting an object such that the subset of objects connected to the requested object can be included in the data package to send to the client. In the left of FIG. 6 a set of rules that decides which objects should be included in the subset is shown.

There is also a client transport module 216 and a server transport module 229 for enabling communication between the client and server over a computer network.

Figure 3:
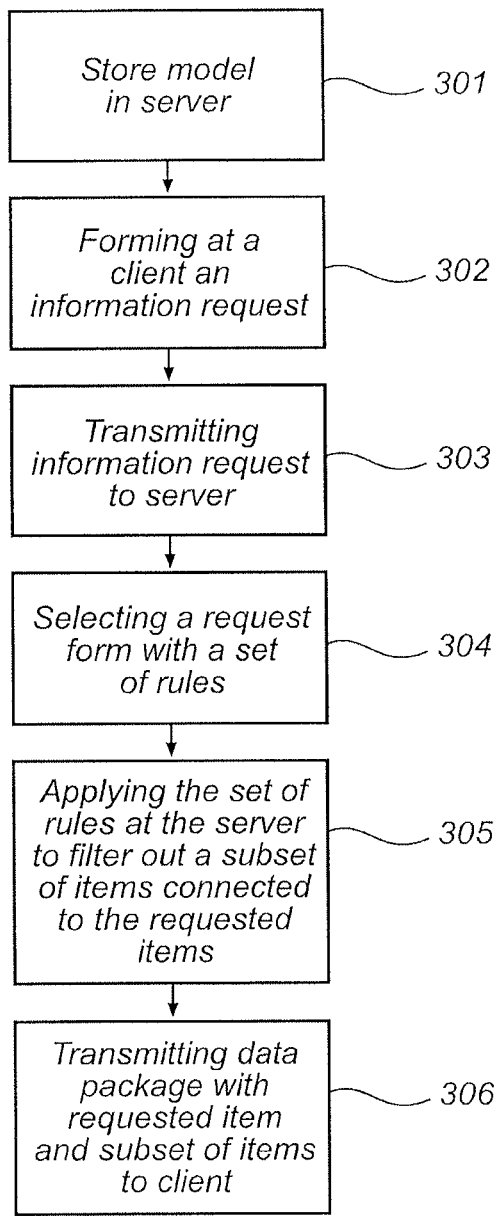
FIG. 3 schematically illustrates a method for retrieving a relational model stored in a server according to a preferred embodiment of the invention.

FIG. 3 schematically illustrates a method for retrieving a relational model stored in a server according to a preferred embodiment of the invention. First, in step 301, the model is stored in the server as a network of objects connected via links.

Then, when a client wants to access the model, the client's information request tool forms a request for a requested object of a predetermined identity stored in the database server 221 and objects connected to the requested object as illustrated by step 302. The information request is then transmitted from the client to the server in step 303, over the network 230, passing one or more routers on its way 231. Here it should be observed that at the client only the requested object need to be identified together with the information that also objects connected to the requested object should be retrieved. No prior knowledge of the identity of such objects needs to be known.

After receiving the request, the server retrieves the requested object stored in the database and selects a request form in the request form storage area in step 304.

Although it is here assumed that the request form is stored at the server 220, the request form may instead be stored at the client 210 in which case the request form can be included in the request sent from the client to the server. Then, in step 304, at the server the request form applicator retrieves objects connected to the requested object and applies a set of rules prescribed by the request form for filtering out a subset of objects from among the objects connected to the requested object, wherein a data package containing the resulting subset of objects and the requested object is created. The data package is then transmitted over the network 230 back to the client 210 in step 305. Here, the data package will typically include all information required by the client to access and display the model, and no complementary requests are required.

It can be noted that although the subset of objects and the requested object is transmitted as a single data package, this data package may be split up in smaller packages on its way across the network as required, for example, to adapt the size of the data package to bandwidth restrictions without substantially affecting the response time.

Figure 4:
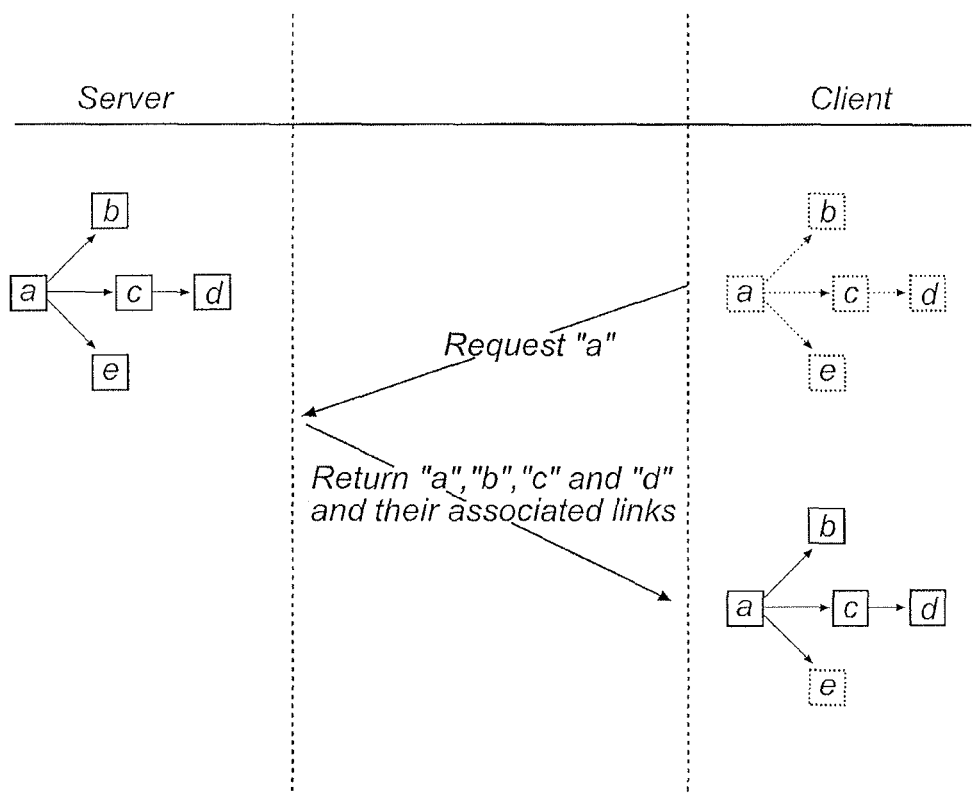
FIG. 4 schematically illustrates an example where a relation model stored in a server is uploaded to the client's cache according to an embodiment of the invention.

As schematically illustrated in FIG. 4, the above described method allows the relation model to be uploaded to the client cache by a single request. This can be compared to the prior art arrangement illustrated in FIG. 1 where uploading of the same model required three requests.

Figure 5:
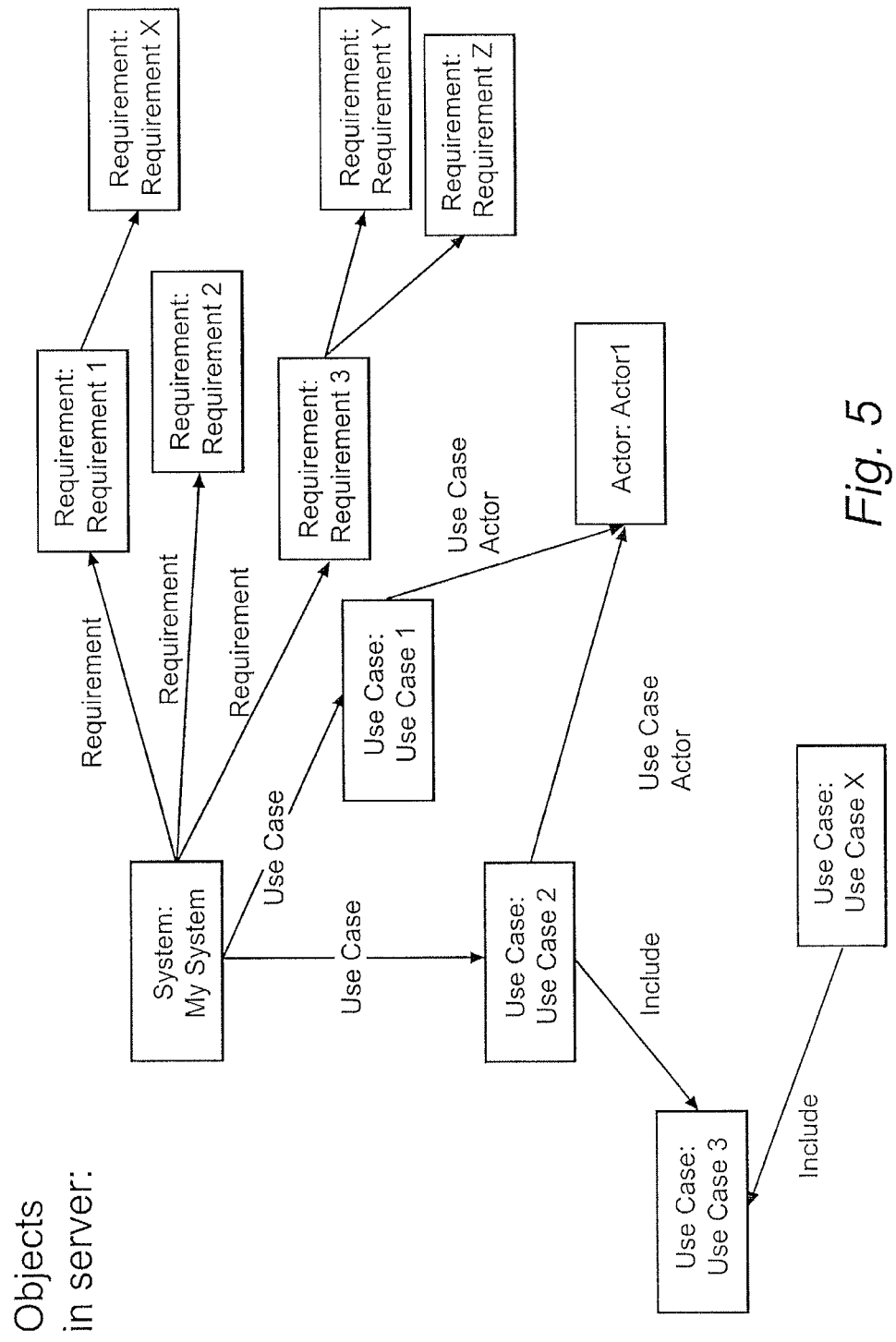
FIG. 5 illustrates an example of a model stored in a server.

In FIG. 5 a model called "My system" stored in a server is shown in a graphical representation where the links between the different objects are shown. The model may be described as an entity relationship model. From the entity relationship model a suitable database schema may be created. For a general description of how entity relationship models can be implemented to database schemas it is referred to A. P. G. Brown, Modeling a Real-World System and Designing a Schema to Represent It, in Data Base Description, ed Douque and Nijssen, North-Holland, 1975, ISBN 0-7204-2833-5. An entity relationship model includes a set of entities connected via links. A plurality of entity types exist. The links describes the relation between the connected entities. Also the links may be of different types. The entities are stored in a database as objects. The development of entity relationship models are described in "Databases Demystified"; Oppel, Andrew; ISBN 007-225364-9.

In FIG. 5 the system includes an object forming a top node. The object is called "My System". The object "My system" is linked to further objects which are of the types, "Requirement" and "Use Case". The links to the objects of the type "Requirement" are classified as "Requirement Links". The links to the objects of the type "Use Case" are classified as "Use Case Links". It may be noted that the Object Requirement 1 further links to an object Requirement X via a requirement Link. The object "Requirement 3" links to two objects, Requirement Y and Requirement Z via requirement links. The object Use Case 1 links to an object of the type "Actor". The object Use Case 2 links to an object of the type "Actor" and to the object Use Case 2. The links between an object of the type "Use Case" and an object of the type "Actor" are called "Use case actor".

Furthermore the object Use Case 2 links to an object of the type "Use Case". The Object Use Case 2 links to a further object Use Case 3. A further description of how objects may be linked to each other is given in WO 2004/057500. The link between the Use Case 2 and Use Case 3 is of the type "include". FIG. 5 is therefore an example of a network 501 of objects 502 connected via links 503. The object may be of a plurality of types and the links may be of a plurality of types.

In FIG. 6 a view 601 of a model stored in a database is shown. A view consists of a stored query accessible as a virtual table composed of the result set of a query. A view is a presentation of a subset of a model. The presentation may be graphical or textual. Here the view presents a subset of the model "My system". In the embodiment shown in FIG. 6 the view includes two presentations of the subset of the model. To the left a hierarchical graph 602 in a generic tree view of the subset of the model is shown. It may be seen that the object "My system" links to Use Case 1, Use case 2 and Use Case 3. Furthermore the object My System links to Requirement 1, Requirement 2 and Requirement 3. Use Case 1 links to Actor 1 and Use Case 2 links to Actor 1 and Use case 3. Part of the view 606 shown on the right side of the window is created by selection among a set of rules 604 defined in the window to the far left. The set of rules are created by a request form 605. The hierarchical view 602 shown on the right side is created by hard coded rules. The code generating the presented view may be expressed as:

GetParts(Type="UseCase")
for each object
GetParts(Type="include")
GetParts(Type="Actor")
For each object
Draw(object)

The hardcoded presentation of the view retrieves the "Usecase" and actors and includes use cases.

The request form may be in the format of a selection list. The rules determine which type of object and which type of link will be shown in the presentation. A complex model, such as a complete description of a vehicle, may contain hundreds or thousands of different objects and hundreds or thousands of different links. When requesting an object, the view will present the requested object and all objects of types according to a request form are linked to this object via a link of a type according the request form. The request form may be in the form of a selection list.

The selection list 605 forms the rules that determine which objects will be retrieved and be presented in the view. When retrieving the objects, the complete view is preferably built up in a recursive manner. First the initial object with a predetermined identity is requested. Then it is verified if this object links to other objects of types according to a selection in a selection list that are linked to this object via a link of a type according to a selection in a selection list. These objects are collected and it is then again verified if these objects links to other objects of types according to a selection in a selection list that are linked to this object via a link of a type according to a selection in a selection list. When an object does not link to further objects of types according to a selection in a selection list that are linked to the objects via a link of a type according to a selection in a selection list, the search string is ended.

A recursive search for objects to be presented may have the following code:

Generate Package(Object):
  If object not in package then store Object in Package
  Find Linked Objects
  For each Linked Object
    If Linked Object in Rule
    Store Link in Package
    Then Generate Package (Linked Object)

A request for a requested object of a predetermined identity and objects connected to the requested object is performed at the client. The request is submitted over a computer network to the server. At the server a package containing the requested object and objects connected to the requested object is generated. A recursive manner of creating the package is preferred. This recursive manner may be performed as is explained above. The packaging of the data package is performed by the request form applicator which, preferably in a recursive manner, applies the rules as defined in the selection list to the requested object and the objects connected thereto.

The server first receives the request for the requested object of a predetermined identity and objects connected to the requested object. The requested object will be stored in the package. As a next step all objects that are directly linked to the requested object will be identified. The rules will be applied to the Linked Objects. For all Linked Objects that are according to the set of rules the step of storing the link to the Linked Object in the package will be followed by a request for generating a package for the Linked Object. A Linked Object is thus an object that is connected to a requested object directly via a link.

Hence a structure of the requested object together with all the linked objects that are connected to the requested object which linked objects fulfill the rules set in the set of rules will be present in the package.

The package is sent to the client.

At the client an unpacking of the package may take place where the structure of the requested object and the linked objects may be recomposed such that the connection between the objects via its links may be visualized textually or graphically. During unpacking at the client logical references in the objects serving as links between objects are translated into physical links in the address space of the storage area of the client.

In the right part of the view 601 a graphical representation 603 of the model is shown. Here the rules are hard coded and cannot be selected by the user. The hard coded rules in the example are shown to the right of the view 601. These are normally not shown on the screen.

Figure 7:
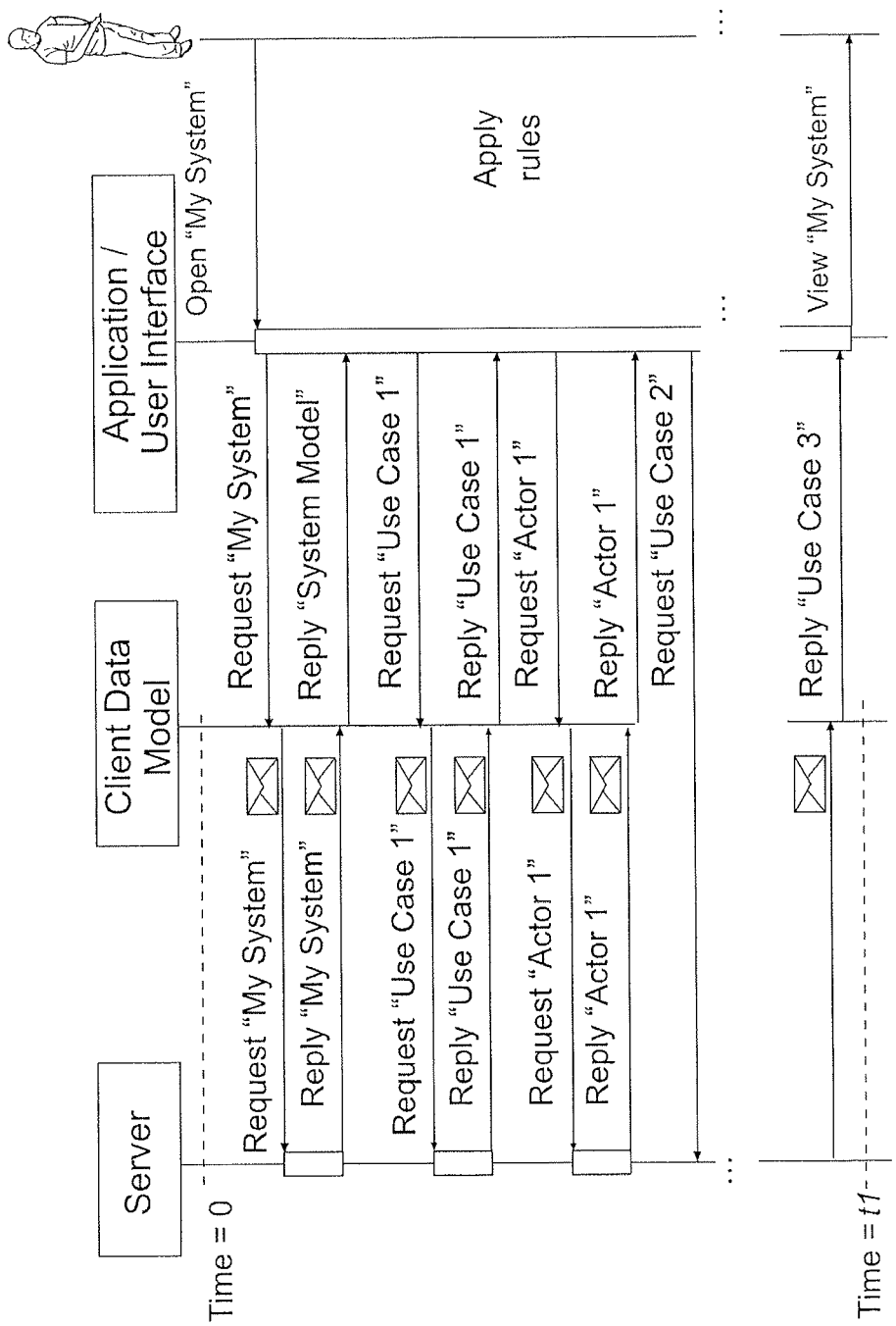
FIG. 7 illustrates an upload sequence using a state of the art downloading method.

In FIG. 7 an upload sequence using a state of the art downloading method is illustrated. It is apparent that the rule is applied at the client side and that the construction of the view is performed by series of requests from the client side to the server side. The communication between the Client Data model and the Server is over the network and is hence slow and subject to latency.

In contrast, according to the invention the construction of the view is performed by performing the recursive requests at the server side such that the requested subset of the model is aggregated at the server side before transmitting the subset to the client in order to present the view.

Figure 8:
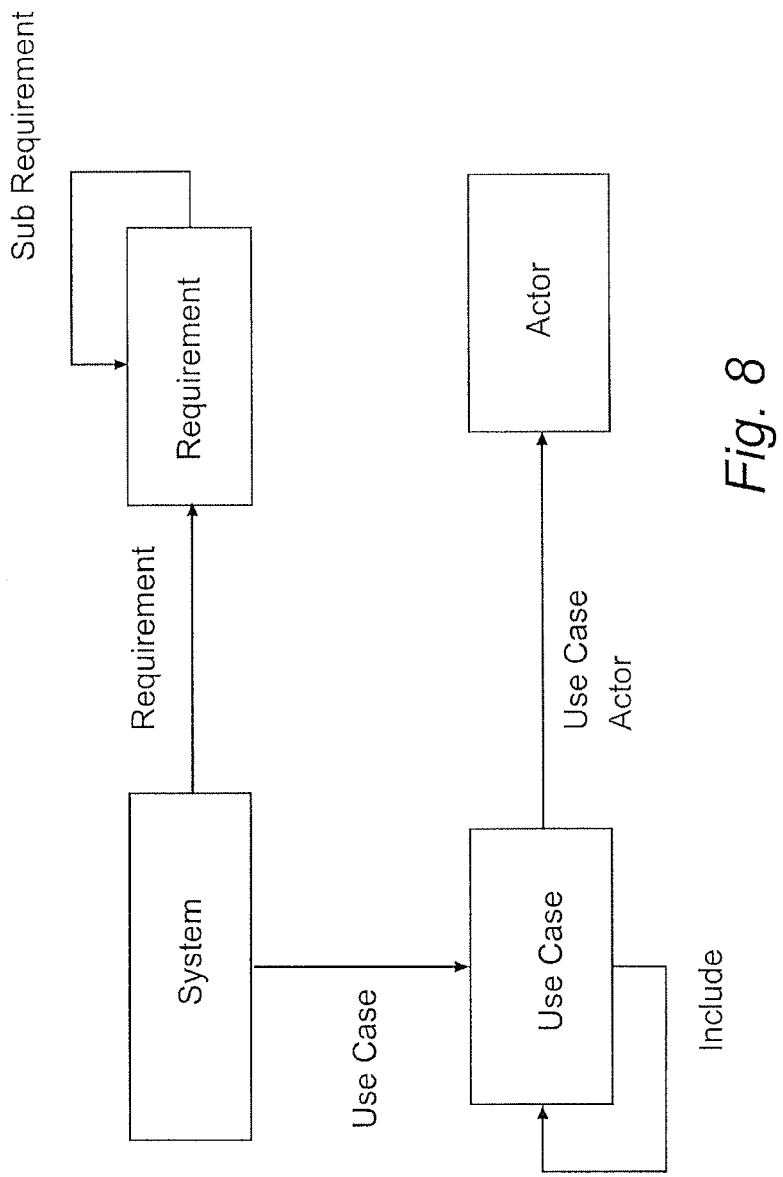
FIG. 8 illustrates an entity relationship diagram.

In FIG. 8 an entity relationship diagram of the model as shown in FIG. 5 is shown. An entity relationship diagram presents the manner in which the objects in the model may relate to each other. From the drawing it may deducted that in the example there are four different types of objects. "System", "requirement", "use case" and "actor". Five different links are included, "use case", "Requirement", "Sub-requirement" and "use case actor". It is evident that the object "system" may be connected to a "use case" object via a "use case" link and to a "requirement" object via a "requirement" link. An "use case" object may be connected to an "use case" object via an "include" link or to an "actor" via and "Use case actor" link.

A "requirement object" may be connected to a "requirement" object via a "sub-requirement" link. Naturally any number of different objects and links may exist depending on the complexity of the system that is to be described. The entity relationship diagram shows the interaction and relation between the different types of objects in a system. From the entity relationship model a suitable database schema may be created. The database schema describes what types of objects and links exists in the database. The rules for filtering out a subset of objects from the model stored in the database are suitably stored together with the database schema or form integral part thereof. The rules may be applied by making an appropriate selection in a selection list.

Figure 9:
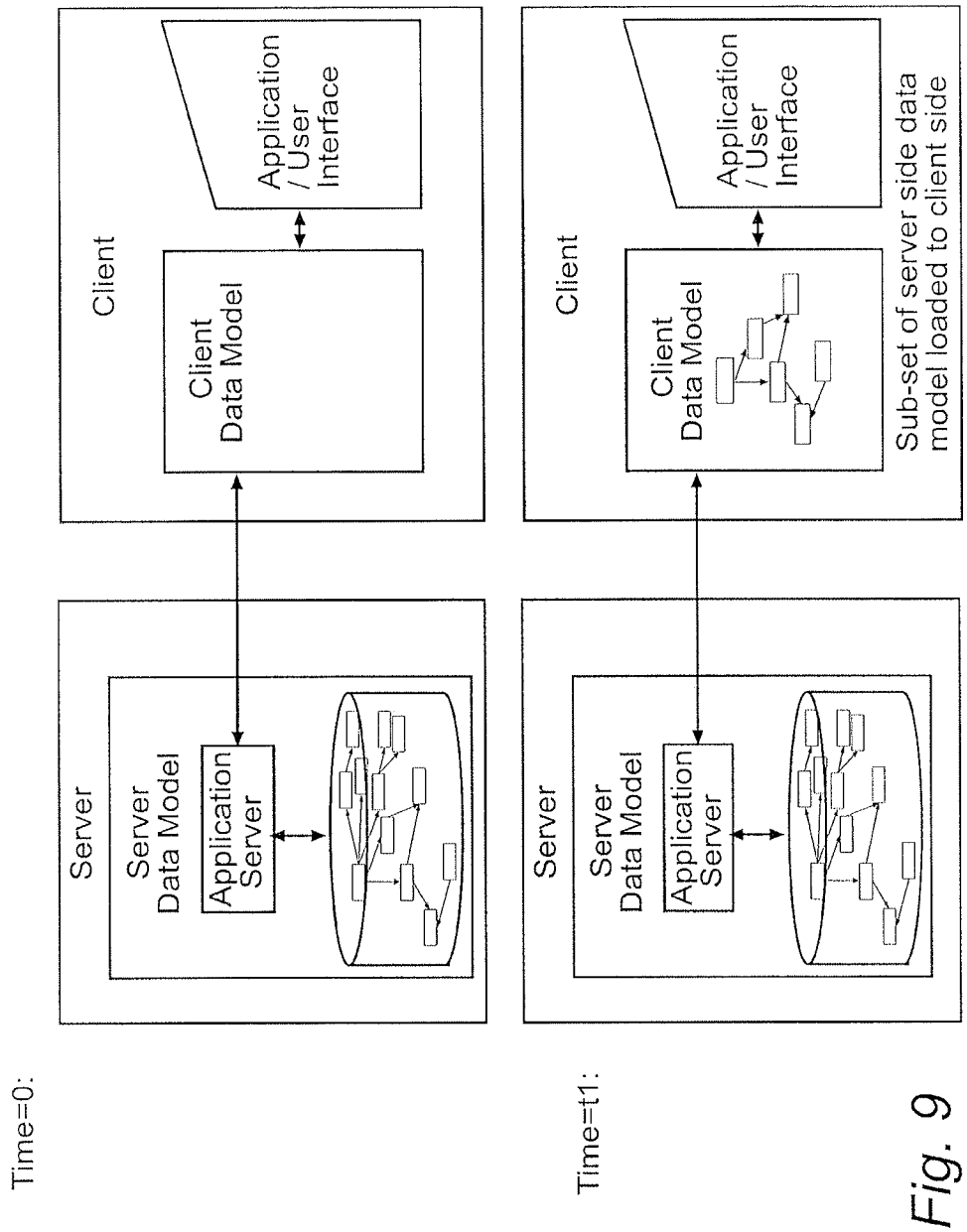
FIG. 9 shows a download sequence of a part of a model.

In FIG. 9 a download sequence of a part of a model according to the invention is shown. At time t= to a request for an object of a predetermined identity and a subset of objects connected to the requested object is made. The drawing schematically illustrates that a model formed by a network 901 of interconnected objects are stored at the server 902. At the server a request form applicator applies the rules according to a selection list stored at the server or transmitted to the server when forming the request for an object. The server runs through the selection list and generates a packet containing the requested object 903 and a subset of objects 904 according to the selection list. The subset of objects includes the objects that are connected to the requested object and which object are of the type specified in the selection list, and/or which are connected to the requested object via links which are of the type specified in the selection list. The requested object and the subset of connected objects are transmitted to the client at time t=t1.

Figure 10:
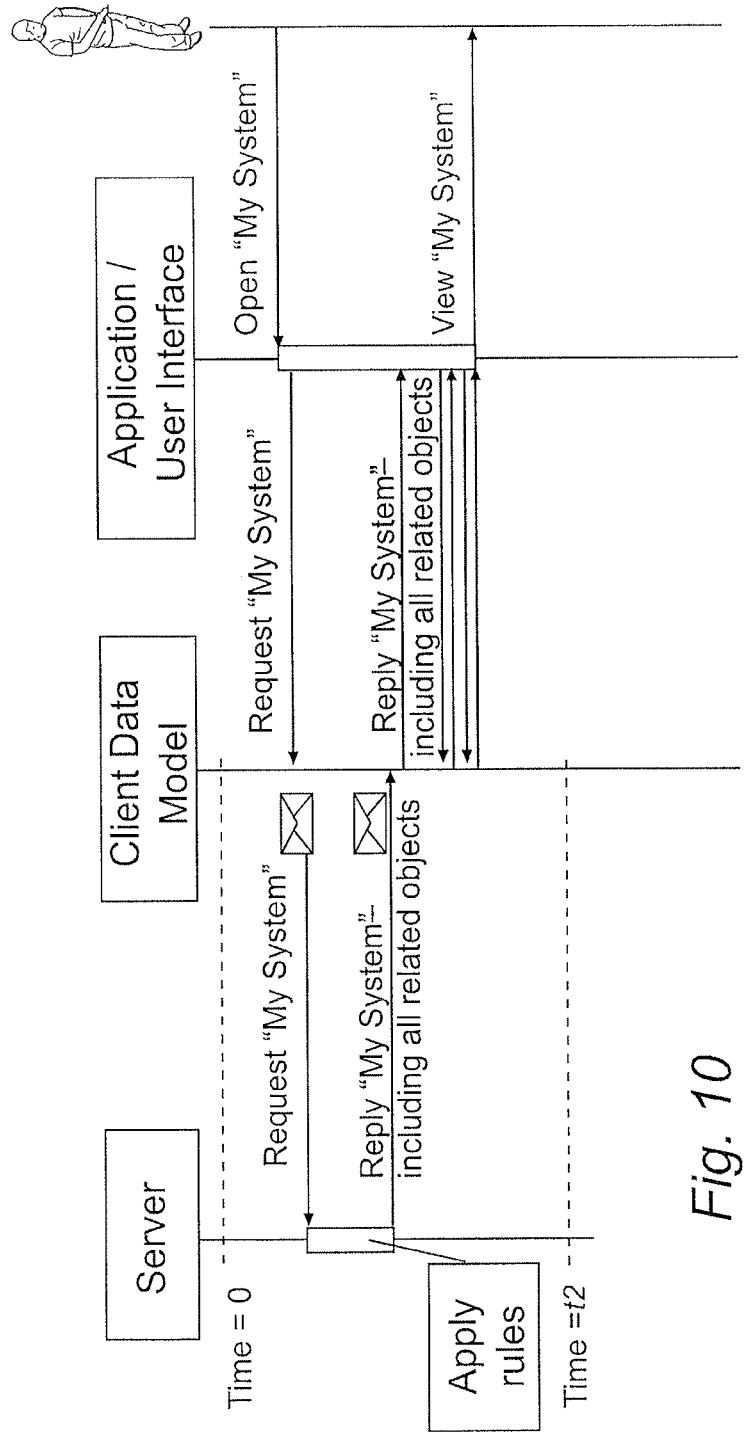
FIG. 10 shows an example of an interaction between the client and the server when opening "My system".

In FIG. 10 an example of an interaction between the client and the server when opening "My system" is shown. First the object "My system" is opened by a user at the client application/user interface. A request for my system is thereafter transmitted to the client data model which is present at the client computer. If "My system" is presently not available at the client computer, a request for transmitting "My system" is made to the server. At the server a package containing "My system" including a requested object and all objects according to the rules set at the server is formed. The server thus expands a requested object (here "My system") into a set of objects containing the requested object and all related objects according to link types and/or object types.

The package is transmitted to the client data model present at the client computer. A user then has access to "my system" at the client computer and may view and manipulate the object according to the users' desire at the client computer. This may include opening of the transmitted objects and requesting downloading of further parts of the complete model stored in the server. The communication between the client data model and the application user interface is application internal and hence fast and not subject to latency.

Figure 11:
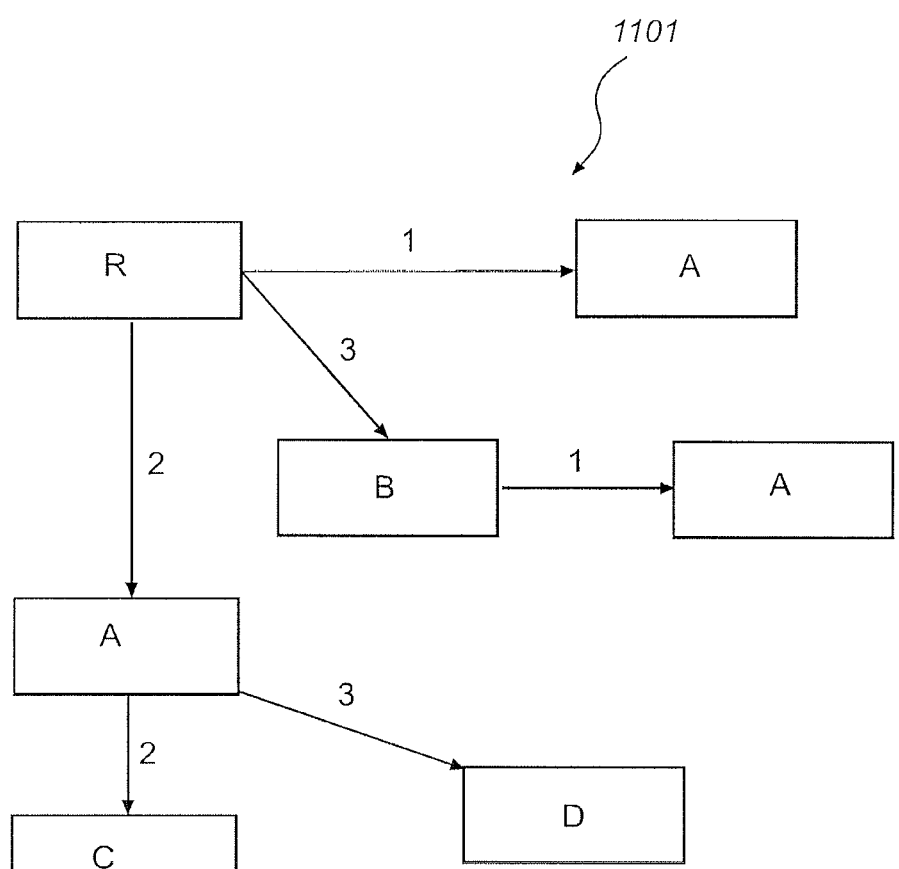
FIG. 11 shows an example of a network of objects.

In FIG. 11 an example of a network 1101 of objects is shown. The network of objects includes a requested object R and objects of the types, A, B, C and D which are connected via links of types 1, 2 and 3. In FIG. 12 request form 1201 defining a set of rules is shown. The request form 1201 defines the following rules in the example: select objects connected to the requested object via links of type 2 and 3, and discard objects connected via link of type 1. Select objects of types A, B and D and discard objects of type C. In FIG. 13 is shown, an example of a data package 1301 resulting from the application of the request form in FIG. 12 on the model shown in FIG. 11. The data package contains the requested object R, link 2 to object A, object A, link 3 to object D, object D, link 3 to object B and object B. In the example a semicolon has been used to indicate the end of a branch, while a colon indicates that the branch has further objects connected. The data package 1301 may be unpacked at the client to show the requested object R and a subset of objects connected to the requested object as shown in FIG. 14.

The invention has mainly been described above with reference to a few embodiments. However, as is readily appreciated by a person skilled in the art, other embodiments than the ones disclosed above are equally possible within the scope of the invention, as defined by the appended claims. For, example although the invention has been described for a multi-tier client-server architecture other forms of client-server architectures may be utilized. Furthermore, the database server may be a distributed database.

The invention claimed is:

1. A method for a modeling tool and for retrieving a pre-identified object and a plurality of objects linked to said pre-identified object via links from an object database of a server, wherein said plurality of objects and said pre-identified object are stored in said object database, wherein said plurality of objects, said pre-identified object, and said links represent a computer model of a technical device modeled via the modeling tool, and wherein said method comprises:

forming, at a client device, a request for (i) said pre-identified object, wherein said pre-identified object has a predetermined identity in said database, and (ii) said plurality of objects linked to said pre-identified object;

transmitting said request from said client device to said server over a computer network;

selecting a set of rules for filtering out a subset of objects from said plurality of objects linked to said pre-identified object to create a first data package containing said pre-identified object and said subset of objects;

retrieving said pre-identified object and objects linked to said pre-identified object from said object database;

creating said first data package at the server containing said pre-identified object and said subset of objects linked to said pre-identified object, wherein said creating of said first data package comprises performing a recursive process, and wherein said recursive process comprises in a first step, storing the pre-identified object as part of the first data package, in a second step, identifying all linked objects, where a linked object is an object directly linked to said pre-identified object, in a third step, applying said set of rules to said linked objects, and in a fourth step, storing a link to one of said linked objects in said first data package followed by performing said first to said fourth steps with said one of said linked objects as a pre-identified object, wherein the fourth step is repeated for all of said linked objects that are according to said set of rules; and transmitting said first data package to said client device.

2. The method according to claim 1, wherein:

said plurality of objects are in a network of objects;

said plurality of objects comprise first objects and second objects;

said network of objects includes said plurality of objects and a plurality of types of links;

said first objects are linked to each other via first ones of said plurality of types of links, and wherein said second objects are linked to each other via second ones of said plurality of types of links; and during said recursive process, said applying of said set of rules includes determining which of said plurality of objects are linked to said pre-identified object by one or more of the plurality of types of links, wherein said one or more of the plurality of types of links are identified on a request form, and discarding ones of said plurality of objects that are (i) not linked to said pre-identified object by said one or more of the plurality of types of links, or (ii) are linked to said pre-identified object by links not identified on said request form.

3. The method according to claim 2, wherein said request form is stored on said server.

4. The method according to claim 3, wherein said request form is stored on said client device and transmitted to said server as a consequence of said request for said pre-identified object.

5. A non-transitory computer readable medium configured to store a computer program comprising program code for performing the method of claim 1, when said computer program is executed on a computer.

6. The method according to claim 1, wherein said forming of said request for said plurality of objects linked to said pre-identified object is performed without identifying any of said plurality of objects.

7. The method according to claim 1, further comprising:

during said recursive process and for a first object in said subset of objects, forming a second data package, wherein said second data package includes (i) said first object in said subset of objects, and (ii) a second object linked to said first object in said subset of objects;

during said recursive process and for a third object in said subset of objects, forming a third data package, wherein said third data package includes (i) said third object in said subset of objects, and (ii) a fourth object linked to said third object in said subset of objects; and transmitting said second data package and said third data package along with said first data package to said client device.

8. The method according to claim 7, further comprising including said second data package and said third data package in said first data package.

9. The method according to claim 1, wherein said forming of said request comprises requesting identification of one or more links of a predetermined type that are linking one or more of said subset of objects to said pre-identified object.

10. The method of claim 1, wherein said recursive process comprises forming a respective data package for each of said linked objects that are according to said set of rules.

11. The method of claim 10, wherein the first data package comprising said pre-identified object comprises said data packages formed for each of said linked objects that are according to said set of rules.

12. A system for retrieving data from an object database, said system comprising:

a server configured to store a network of objects linked together via a plurality of links, wherein said network of objects include a pre-identified object and a plurality of objects, wherein said pre-identified object, said plurality of objects, and said plurality of links represent a computer model of a technical device modeled via a modeling tool;

a client device including an application with an information request tool for generating a request for (i) the pre-identified object, and (ii) objects linked to said pre-identified object, wherein said objects linked to said pre-identified object include a set of objects, wherein said request does not identify said objects linked to said pre-identified object, and wherein said server is configured to, based on said request, store a request form for retrieving (i) the pre-identified object, and (ii) said set of objects linked to the pre-identified object;

a client transport module and a server transport module for enabling communication between the client device and said server over a computer network; and a request form applicator arranged to (i) retrieve said pre-identified object, (ii) retrieve said objects linked to said pre-identified object, (iii) select a set of rules for filtering out a subset of objects linked to said pre-identified object, (iv) apply said set of rules at said server to filter out said subset of objects from said set of objects linked to said pre-identified object, and (v) create at the server a single data package containing said pre-identified object and said subset of objects, wherein said creating of said data package comprises retrieving said pre-identified object and said subset of objects linked to said pre-identified object, and performing a recursive process comprising
in a first step, storing said pre-identified object as part of said data package,
in a second step, identifying all linked objects, where a linked object is an object directly linked to said pre-identified object,
in a third step, applying said set of rules to said linked objects, and
in a fourth step, storing a link to one of said linked objects in said data package followed by performing said first to said fourth steps with said one of said linked objects as a pre-identified object, wherein the fourth step is repeated for all of said linked objects that are according to said set of rules, and
wherein said server is configured to transmit said data package to said client device.

13. A system according to claim 12, wherein:
said plurality of links include links of different types; and
said request form applicator is configured to, during said recursive process and while applying said set of rules to said set of objects,
determine which of said set of objects are linked to said pre-identified object by one or more types of links, wherein said one or more types of links are identified on said request form, and
discard ones of said set of objects that are (i) not linked to said pre-identified object by said one or more types of links, or (ii) are linked to said pre-identified object by links not identified on said request form.

14. A system according to claim 12, wherein said server includes a memory for storing said request form.

15. A system according to claim 12, wherein, for each set of two directly linked objects, (i) a first object in said set of two directly linked objects is an owner object, and (ii) a second object in said set of two directly linked objects is an owned object.

16. A server comprising:
a memory configured to (i) store a network of objects linked together via links, and (ii) based on a request from a client device, store a request form for retrieving a pre-identified object and a set of objects linked to said pre-identified object from an object database, wherein the object database is configured to store said pre-identified object and said objects linked together via said links, wherein said network of objects linked together via said links include said pre-identified object and objects linked to said pre-identified object, wherein said objects linked to said pre-identified object include said set of objects, and wherein said pre-identified object, said objects linked to said pre-identified object, and said links represent a computer model of a technical device modeled via a modeling tool; and
a request form applicator configured to
receive the request from the client device, wherein the request (i) requests the pre-identified object and objects linked to said pre-identified object, and (ii) provides a set of rules, wherein said objects linked to said pre-identified object include said set of objects, and wherein said request does not identify said objects linked to said pre-identified object,
retrieve said pre-identified object and said objects linked to said pre-identified object from said object database, and
create a data package including performing a recursive process, wherein said recursive process comprises
in a first step, storing said pre-identified object as part of said data package,
in a second step, identifying all linked objects, where a linked object is an object directly linked to said pre-identified object,
in a third step, applying said set of rules to said linked objects, and
in a fourth step, storing a link to one of said linked objects in said data package followed by performing said first to said fourth steps with said one of said linked objects as a pre-identified object, wherein the fourth step is repeated for all of said linked objects that are according to said set of rules, wherein said server is configured to transmit said data package to said client device.

* * * * *